(12) United States Patent
Venkatachalapathy et al.

(10) Patent No.: US 8,705,394 B2
(45) Date of Patent: Apr. 22, 2014

(54) BGP SLOW PEER DETECTION

(75) Inventors: Balaji Pitta Venkatachalapathy, Sunnyvale, CA (US); Isidor Kouvelas, Halandri (GR); Keyur P. Patel, San Jose, CA (US); Anantha Ramaiah, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 13/100,181

(22) Filed: May 3, 2011

(65) Prior Publication Data

US 2012/0263049 A1    Oct. 18, 2012

(30) Foreign Application Priority Data

Apr. 18, 2011    (EP) ..................... 11386008

(51) Int. Cl.
*H04L 12/56*    (2006.01)
*H04L 12/26*    (2006.01)

(52) U.S. Cl.
CPC .............. *H04L 45/023* (2013.01); *H04L 43/00* (2013.01)
USPC ...................................................... 370/252

(58) Field of Classification Search
None
See application file for complete search history.

(56) References Cited

U.S. PATENT DOCUMENTS

| | | | |
|---|---|---|---|
| 6,760,777 B1 * | 7/2004 | Agarwal et al. | 709/238 |
| 6,938,095 B2 * | 8/2005 | Basturk et al. | 709/238 |
| 7,359,393 B1 * | 4/2008 | Nalawade et al. | 370/401 |
| 7,532,631 B2 * | 5/2009 | Raszuk et al. | 370/401 |
| 7,571,241 B1 | 8/2009 | Nalawade | |
| 7,675,912 B1 | 3/2010 | Ward et al. | |
| 7,710,899 B1 | 5/2010 | Ward et al. | |
| 7,739,404 B2 | 6/2010 | Li | |
| 7,864,706 B1 | 1/2011 | Zinjuwadia et al. | |
| 2002/0165981 A1 * | 11/2002 | Basturk et al. | 709/242 |
| 2004/0260825 A1 * | 12/2004 | Agarwal et al. | 709/230 |
| 2006/0233181 A1 * | 10/2006 | Raszuk et al. | 370/401 |
| 2007/0258376 A1 * | 11/2007 | Li | 370/238 |
| 2011/0026533 A1 | 2/2011 | Nalawade | |
| 2012/0014672 A1 * | 1/2012 | Kasuya | 386/281 |

OTHER PUBLICATIONS

"BGP Peer Groups," Cisco Systems, Inc., Document ID: 13755, Oct. 30, 2008, pp. 1-3.
"Detecting and Mitigating a BGP Slow Peer," Cisco Systems, Inc., Jul. 30, 2010, pp. 1-24.

(Continued)

*Primary Examiner* — Chi Pham
*Assistant Examiner* — Kouroush Mohebbi
(74) *Attorney, Agent, or Firm* — Novak Druce Connolly Bove + Quigg LLP

(57) ABSTRACT

In one embodiment, a router selects a particular peer from an original update group used with an Exterior Gateway Protocol (EGP) such as Border Gateway Protocol (BGP). The original update group includes a plurality of peers of the router that share a same outbound policy and that receive common update messages, from the router, of routing table information. The router determines that the particular peer is a potential slow peer based on a first type of indicia, wherein a slow peer is a peer that cannot keep up with a rate at which the router generates update messages over a prolonged period of time. The router confirms that one or more second types of indicia are consistent with the particular peer being a slow peer. In response to the confirmation, the router determines that the particular peer is a slow peer.

20 Claims, 4 Drawing Sheets

(56) References Cited

OTHER PUBLICATIONS

Rekhter, Y., ed., et al., "A Border Gateway Protocol 4 (BGP-4)," RFC 4271, Jan. 2006, pp. 1-104.

Scudder, J., et al., "BGP, Where Are We Now?," IETF-68, Mar. 22, 2007, pp. 1-22.

Wright, G., et al., *"TCP Timers," TCP/IP Illustrated, vol. 2: The Implementation,* Addison-Wesley: Reading, Massachusetts, 1995, pp. 817-849.

\* cited by examiner

BGP SLOW PEER DETECTION

RELATED APPLICATIONS

This application claims the benefit of European Patent Application No. 11386008.4, filed with the Greek Patent Office on Apr. 18, 2011, the contents of which are incorporated herein by reference in their entirety.

TECHNICAL FIELD

The present disclosure relates generally to computer networks, and, more particularly, to peer groups (update groups) used with exterior gateway protocols (EGPs) such as border gateway protocol (BGP).

BACKGROUND

A router implementing an Exterior Gateway Protocol (EGP) such as Border Gateway Protocol (BGP), typically generates update messages that are sent to its peers, in order to propagate routing information to the peers. Peers who share a same outbound policy may be grouped together into peer groups (update groups). An update group reduces the load on system resources by allowing the router to generate a common set of update messages, which are replicated to all update group members. This can significantly reduce the resources consumed in comparison to treating each peer in the update group individually. However, sometimes one or more peers in an update group persistently cannot keep up with the flow of update messages. When a peer in an update group cannot keep up, the number of update messages pending transmission may build up, and the update group is "throttled" back. The rest of the members of the update group, which can keep up, are forced to wait for the peer to consume update messages. Even if new routing information is available for the rest of the members of the update group, the presence of the peer that cannot keep up in the update group effectively blocks generation of new update messages for the other peers. Accordingly, there is a need for improved techniques for identifying and dealing with peers in an update group that persistently cannot keep up with the flow of update messages.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a router selects a particular peer from an original update group used with an Exterior Gateway Protocol (EGP) such as Border Gateway Protocol (BGP). The original update group includes a plurality of peers of the router that share a same outbound policy and that receive common update messages, from the router, of routing table information. The router determines that the particular peer is a potential slow peer based on a first type of indicia, wherein a slow peer is a peer that cannot keep up with a rate at which the router generates update messages over a prolonged period of time. The router confirms that one or more second types of indicia are consistent with the particular peer being a slow peer. In response to the confirmation, the router determines that the particular peer is a slow peer. By examining one or more second types of indicia, various circumstances that are known to promote false-identification of slow peers may be checked for, and criteria consistent with the existence of a slow peer may be verified, thereby reducing false-identifications of slow peers.

Description

A computer network is a geographically distributed collection of interconnected communication links used to transport data between nodes, such as computers. Many types of computer networks are available, with the types ranging from local area networks (LANs) to wide area networks (WANs). The nodes typically communicate by exchanging discrete packets or messages of data according to pre-defined protocols. In this context, a protocol consists of a set of rules defining how the nodes interact with each other.

Computer networks may be further interconnected by an intermediate node, such as a router, to extend the effective "size" of each network. Since management of a large system of interconnected computer networks can prove burdensome, smaller groups of computer networks may be maintained as routing domains or autonomous systems (ASes). The networks within an AS are typically coupled together by interior routers, i.e., a type of router that is configured to route within an AS and that is expected to communicate only with routers within the AS. Interior routers typically are configured to execute one or more interior gateway protocols (IGPs), such as Open Shortest Path First (OSPF) routing protocol or Intermediate-System-to-Intermediate-System (ISIS) routing protocol. Various ASes are typically coupled together by exterior routers, i.e., a type of router that is configured to act as a gateway to the outside world beyond the AS and communicate with routers outside of the AS. Exterior routers are typically configured to execute one or more exterior gateway protocols (EGPs), such as Border Gateway Protocol (BGP).

Figure 1:
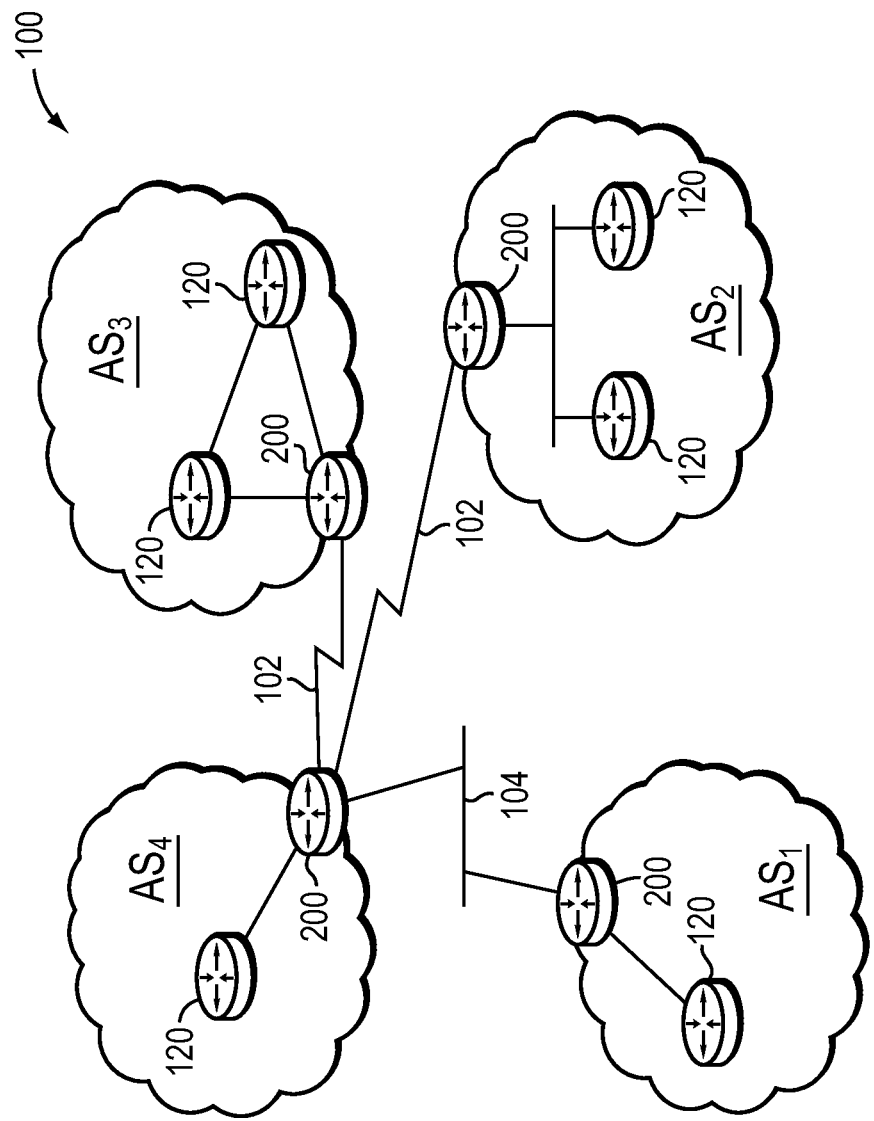
FIG. 1 is a schematic block diagram of an example computer network comprising a plurality of ASes ($AS_{1-4}$) including interior routers and interconnected by exterior to routers.

FIG. 1 is a schematic block diagram of an example computer network 100 comprising a plurality of ASes ($AS_{1-4}$) including interior routers 120 and interconnected by exterior routers 200. The exterior routers 200 may be interconnected by shared medium networks, such as LANs 104, and point-to-point links 102, such as frame relay links, asynchronous transfer mode links, and/or other types of links. As mentioned above, the exterior routers 200 may exchange routing information using an EGP such as BGP. An exterior router 200 configured to execute an implementation of BGP is referred to herein as a BGP router.

Figure 2:
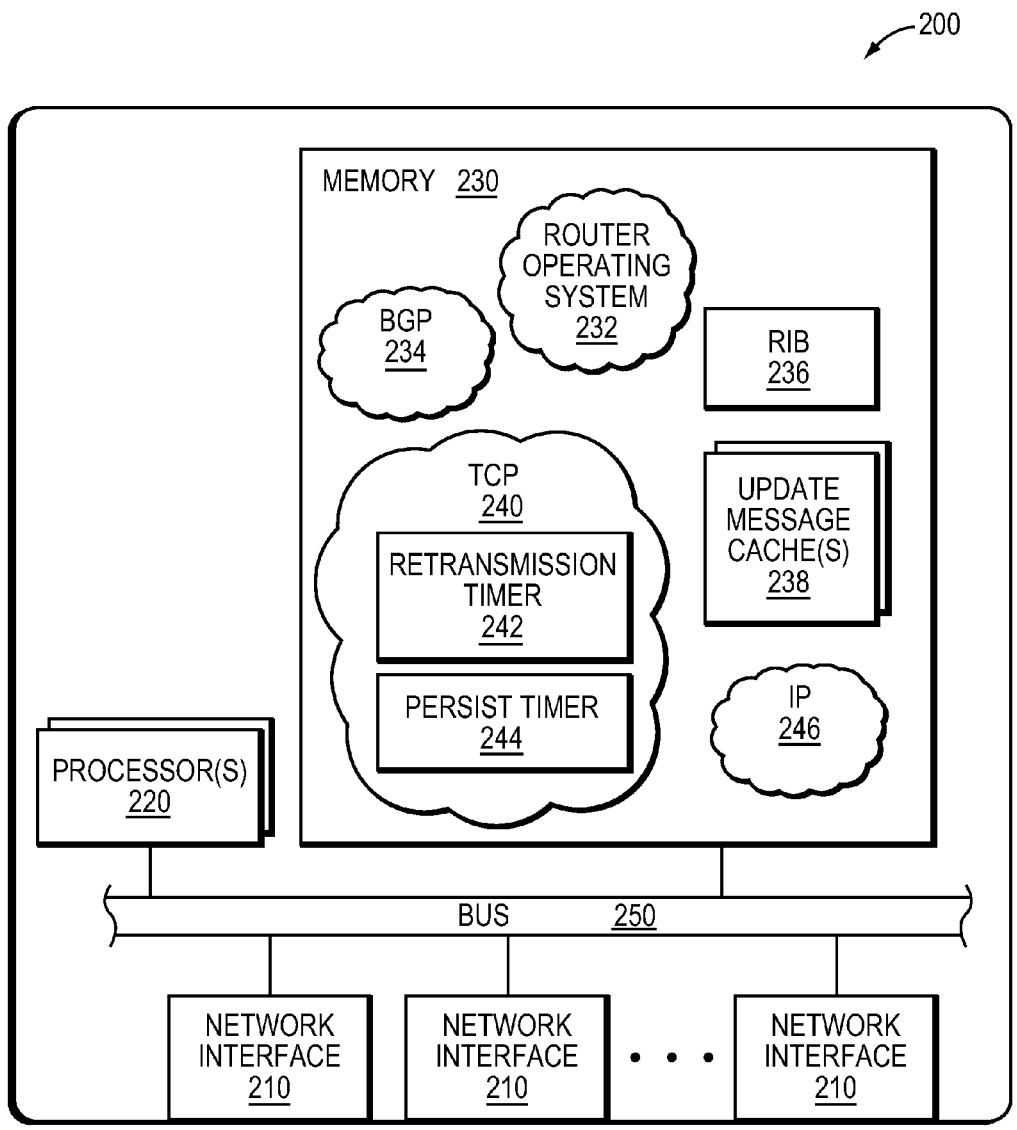
FIG. 2 is a schematic block diagram of an example exterior router, e.g., a BGP router.

FIG. 2 is a schematic block diagram of an example exterior router 200, e.g., a BGP router, which may be used with the embodiments disclosed herein. The exterior router 200 comprises a plurality of network interfaces 210, processor(s) 220, and a memory 230 interconnected by a system bus 250. The network interfaces 210 contain the mechanical, electrical, and signaling circuitry for communicating over links of the computer network 100. The memory 230 comprises a plurality of storage locations for storing software and data structures, including software and data structures used to implement at least some of the techniques disclose herein. The processor(s) 220 include logic configured to execute the software and manipulate data from the data structures. A router operating system 232, portions of which are resident in memory 230 and executed by the processor(s) 220, functionally organizes the router 200. A BGP process 234 may interact with the routing operating system 232. The BGP process 234 may utilize a variety of data structures maintained in memory 230. For example, the BGP process 234 may utilize a Routing Information Base (RIB) 236.

The RIB 236 stores routing information used by BGP and is typically, at least conceptually, divided into three separate sections. First, one or more Adj-RIBs-In each maintain unedited routing information received from neighboring routers (referred herein simply as "peers"). Second, a Loc-RIB maintains the routing information the router 200 utilizes itself, which is developed from the Adj-RIBs-In. Third, one or more Adj-RIBs-Out maintain routing information selected by a decision algorithm of the BGP process 234 to be advertised to one or more peers. In addition to the RIB 236, the BGP process 234 may utilize one or more Update message caches 238, the function of which is discussed in more detail below, as well as a variety of other data structures (not shown), the functions of which are understood by those skilled in the art.

EGPs such as BGP generally operate over a reliable transport-layer protocol, such as Transmission Control Protocol (TCP), that uses a network-layer protocol, such as Internet Protocol (IP). TCP may be implemented by a TCP process 240 and IP may be implemented by an IP process 246. As understood by those skilled in the art, one of the ways TCP provides reliability is by establishing a connection between a TCP sender to a TCP receiver and providing acknowledgments (ACK) for each data segment sent over the connection. Each time a TCP sender sends a data segment it starts a "retransmission timer" 242 corresponding to the connection. If an ACK is not received before expiration of the retransmission timer 242, the sender retransmits the data segment. The length of the spent in a retransmit state while the retransmission timer 242 is running is dynamically determined, in some implementations based on a round trip time (RTT) measured by TCP for the connection, and on a number of times the data segment has been retransmitted. The retransmission timer 242 may be bounded to be between 1 and 64 seconds, but otherwise dynamically changes in length in response to changing conditions.

As understood by those skilled in the art, TCP also uses an end-to-end flow control mechanism for a connection based on a sliding window. The sliding window has a window size indicating an amount of data up to which a TCP sender is allowed to send over the connection before it must wait for an ACK and an accompanying window size update from the TCP receiver. If the TCP receiver advertises a window size of 0, the TCP sender stops sending data, and starts a "persist timer" 244 corresponding to the connection. The persist timer 244 is used to protect TCP from deadlock situations, in which a window size update from the TCP receiver is lost. When the persist timer 244 expires, the TCP sender attempts to send a packet to see if the TCP receiver responds with a new window size. The length of time spent in a persist state while the persist timer 244 is running is dynamically determined, in some implementations based on a RTT measured by TCP for the connection, while in other implementations based on other factors. The persist timer may be bounded to be between 5 and 60 seconds, but otherwise dynamically changes in length in response to changing conditions.

Once peers establish a TCP connection, they introduce themselves and exchange routing information from their RIBs. Typically in an EGP such as BGP, a open message is used to carry introduction information between the peers. Then a series of update messages are used to exchange the initial routing table information. Subsequently, further update messages may be sent including incremental update information in response to changes in the network. In addition, notification messages may be sent to indicate errors, and keep-alive messages may be exchanged periodically when there is no other traffic, to maintain the connection (e.g., the TCP connection) between the peers. Still further, special route-refresh messages may be sent to request a new copy of a peer's routing information.

Figure 3:
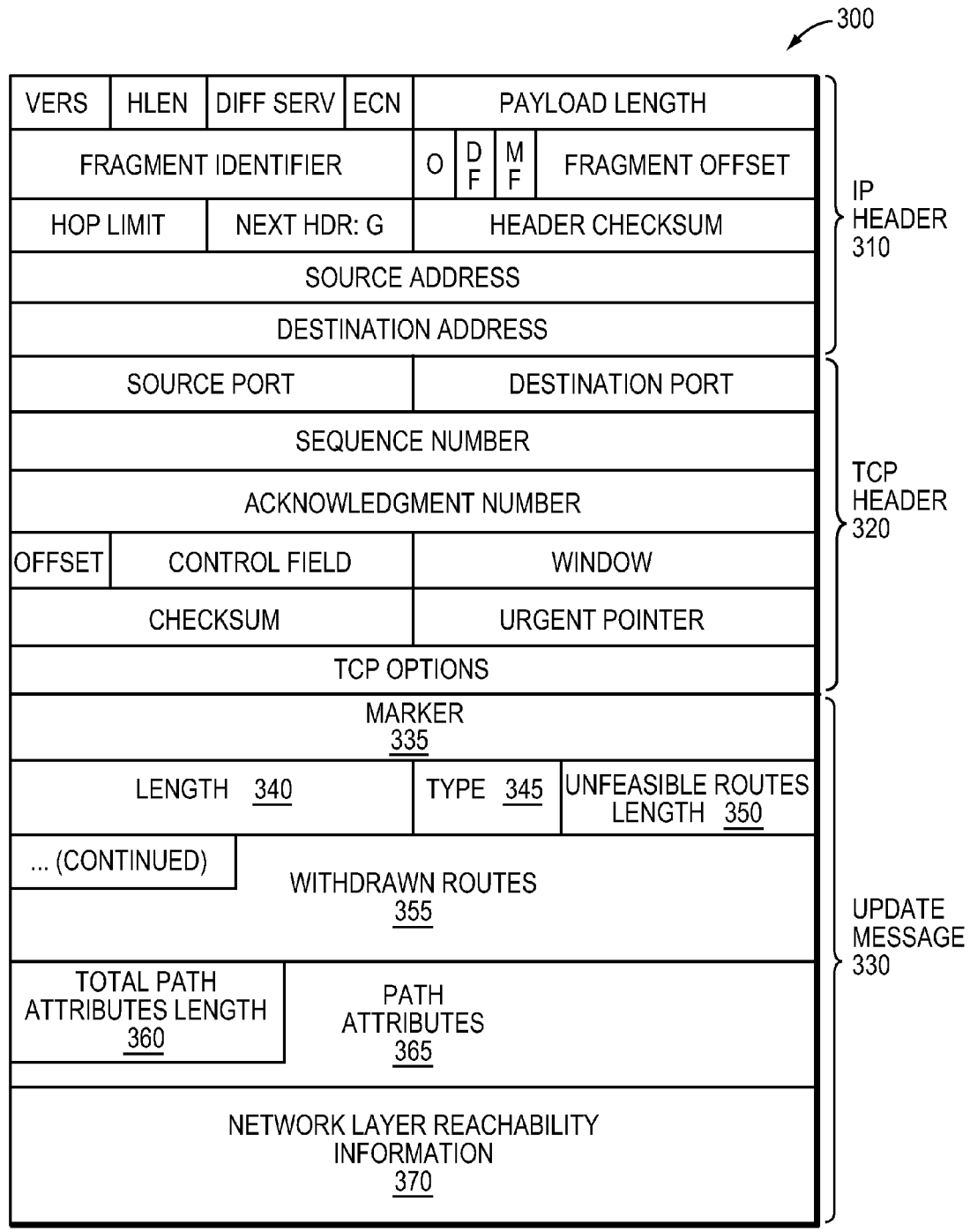
FIG. 3 is a schematic block diagram of an example packet including an update message, e.g., a BGP update message, encapsulated by a Transmission Control Protocol (TCP) header and an Internet Protocol (IP) header.

As discussed above, selected routing information from the RIB 236 of the exterior router 200 may be placed in update messages and sent to peers. FIG. 3 is a schematic block diagram of an example packet 300 including an update message 330, e.g., a BGP update message, encapsulated by a TCP header 320 and an IP header 310. The TCP header 320 and IP header 310 include a plurality of fields, the function of which is understood by those skilled in the art. The update message 330 begins with its own header which includes a marker 335, which generally has all its bits set to 1. Following the marker 335, a length field 340 is provided that contains the total length of the update message 330, and a type field 345 is provided indicates the type of message, here indicating that the message is an update message. Following the header, the update message 330 may contains two separate blocks of information. The first block of information identifies routes that are no longer available, i.e., withdrawn from service. Such block of information includes an unfeasible routes length field 350 that carries the length (in bytes) of a withdrawn routes field 355, which follows. The withdrawn routes field 355 contains a list of address prefixes for the routes that are being withdrawn from service. The second block of information generally describes routes that are valid. Proceeding the valid routes themselves is a total path attributes length filed 360 and a path attributes field 365. The total path attributes length field 360 carries the length (in bytes) of the path attributes field 365. The path attributes field 365 describes the properties of the routes, including such properties as the AS path for the routes. Following the path attributes field 365 is a network layer reachability information field 370 that includes a list of actual valid routes, in the form of a series of address prefixes.

In order to propagate routing information to its peers, an exterior router, e.g., a BGP router, periodically walk portions of its RIB 236, filters prefixes through outbound policies, and generates update messages that are sent to the peers. However, when there are large numbers of peers, treating every peer individually may consume considerable system resources (e.g., processor and memory resources). To address this issue, peers who share the same outbound policy may be grouped together into peer groups (hereinafter referred to simply as "update groups"). An update group reduces the load on system resources by allowing the router to walk the RIB 236 only once, filter the prefixes through the common outbound policies, and generate a common set of update messages, which are replicated to all update group members. Based on the number of update group members, the number of prefixes in the RIB, and the number of prefixes advertised, this can significantly reduce the resources consumed in comparison to treating each peer in is the update group individually.

Each update group is typically allocated a quota of generated update messages that may be maintained in a corresponding update message cache 238 pending transmission to peers. Update messages are added to the corresponding update message cache 238 when they are generated in connection with the update group, and they are removed from the corresponding update message cache 238 when they are transmitted to all the peers in the update group.

However, sometimes one or more peers in an update group persistently cannot keep up with the flow of update messages. As used herein the term "slow peer" refers to a peer of a router that cannot keep up with the rate at which the router generates update messages over a prolonged period of time (e.g., on the order of a several minutes). There may be several reasons why a peer cannot keep up with the rate at which the router generates update messages. For example, in some cases, there may be excessive packet loss or excessively high levels of traffic on a link leading from the router to the particular peer, such that the throughput of the reliable connection (e.g., TCP connection) utilized to send update messages is very low. Alternatively, in other cases, the particular peer's processor(s) may be experiencing a heavy processing load, due to some other task or tasks being performed, and thereby the processor(s) cannot service the connection (e.g., TCP connection) at the required frequency to keep up with the inflow of update messages. As will be understood by those skilled in the art, a variety of other issues may cause a peer to operate as a slow peer. Further, it should be understood that temporary slowness of a peer typically should not lead to the peer being considered a slow peer. For example, certain events that cause large amounts of churn in a RIB (such as a number of connection resets) may cause a brief spike in the rate of update message generation by an exterior router implementing an EGP such as BGP. A peer of that router which temporarily falls behind during such an event, but that quickly recovers after the event ceases, should not be considered a slow peer. It is desirable to reserve the classification of slow peer for peers that cannot keep up with the rate of incoming update messages over a prolonged period of time under more typical conditions.

When a slow peer is present in an update group, the number of update messages pending transmission in the corresponding update message cache 238 typically will build up. When a predetermined cache limit for the corresponding update message cache 238 is reached, the update group is "throttled" back. That is, in order for a new update message to be generated, one of the existing update messages must be transmitted to the slow peer, and then removed from the update message cache 238, to make room for a new update message in the update message cache 238. The rest of the members of the update group that are faster than the slow peer, and that have already consumed the corresponding existing update messages in the update message cache 238, are forced to wait for the slow peer to consume one or more update messages. Even if new routing information is available for the rest of the members of the update group, the presence of the slow peer in the update group effectively blocks generation of new update messages for the other peers, and thereby slows convergence. This blocking of generation of new update messages for other peers in an update group, caused by a slow peer, is referred to herein as the "slow peer problem."

One technique for addressing the slow peer problem is to either statically or dynamically determine a peer is a slow peer, and take action, such as by removing (splitting) the slow peer from its original update group and placing it in a special slow peer update group (i.e., a designated update group reserved for peers that are slow in consuming update messages). This may allow the original update group to function without being throttled back. That is, the rest of the members of the original update group may no longer be forced to wait for the slow peer to consume update messages from the corresponding update message cache 238, and new update messages may be generated and sent to them at a faster rate. The slow peer may still consume update messages at a slow pace, while a member of the slow peer update group. However, it will no longer impact the rest of the members of the original update group, which are capable of consuming update messages at a faster rate.

As mentioned above, a peer may be either statically determined to be a slow peer, or dynamically determined to be a slow peer. In a static technique, a network administrator, or other user, may individually configure a peer that is known to be slow as a static slow peer using a command line interface (CLI) of the router operating system 232, for example, based on knowledge that the peer is coupled to a link of limited bandwidth or has limited processing power. Alternatively, a peer may be configured as a slow peer based upon a policy template.

In a dynamic technique, a peer may be determined to be a slow peer automatically by the router operating system 232 working in conjunction with, for example, the BGP process 234 and other processes on the router 200. Typically, dynamic slow peer detection has relied on an examination of a single type of indicia, specifically upon an examination of timestamps associated with update messages for the peer in the update message cache 238 corresponding to an update group, to determine if the peer is a slow peer. Update messages are typically accorded a timestamp when they are generated and placed in the Update message cache 238 corresponding to an update group. To dynamically detect slow peers, the router operating system 232, in conjunction with the BGP process 234, compares the timestamps associated with update messages in the corresponding update message cache 238 (e.g., the timestamp associated with an oldest update message in the update message cache 238) to the current time, to determine if a peer corresponding to the respective update message is lagging more than a configured "slow peer time threshold" behind the current time. For example, the slow peer time threshold may be configured to be 300 seconds. In which case, if an update message (e.g., the oldest update message) in the corresponding update message cache 238 is associated with a timestamp that is more than 300 seconds behind the current time, the peer corresponding to that update message may be determined to be a slow peer. In this manner, a single type of indicia, namely timestamps associated with update messages, is used to determine if a peer is a slow peer.

Once a peer has been determined to be a slow peer, a network administrator may be notified by the routing operating system 232, for example, with a syslog message. This may enable the network administrator to address a problem that has caused the peer to operate as a slow peer. Alternatively, or additionally, once a peer has been determined to be a slow peer, the slow peer may be automatically moved from its original update group to a special slow peer update group, as discussed above. The slow peer may be retained in the slow peer update group permanently, or may be configured to be dynamically returned to the original update group if conditions should improve, for example, if the timestamps of associated update messages no longer lag significantly behind the current time.

One issue associated with dynamic slow peer detection is false detection of slow peers. In some circumstances, events occurring at the exterior router 200 that dynamically detects the slow peer may cause the peer to appear to be slow, when it actually is not. Likewise, events occurring elsewhere may cause the peer to appear to be slow, when it actually is not. If a falsely-identified slow peer is moved to a slow peer update group, and placed with actual slow peers, it will be forced to wait for the actual slow peers to consume update messages and convergence will be unnecessarily slowed. If dynamic slow peer detection is quite inaccurate, its benefits may be negated. Accordingly, there is a need for a technique to more accurately determine if a peer is a slow peer and minimized false detection.

Improved Slow Peer Detection

According to embodiments of the present disclosure, a router operating system 232 working in conjunction with, for example, the BGP process 234 and other processes on an exterior router 200 (e.g., a BGP router) implements an improved slow peer detection technique. The router 200 selects a particular peer from an original update group and determines that the particular peer is potentially a slow peer based on a first type of indicia. One or more second types of indicia are examined to verify/confirm that the peer indicated by the first type of indicia to be a potential slow peer is actually a slow peer. In response to confirmation by these one or more second types of indicia, the particular peer is finally determined to be a slow peer. By examining one or more second types of indicia, various circumstances that are known to promote false-identification of slow peers may be checked for, and criteria consistent with the existence of a slow peer may be verified, thereby reducing false-identifications of slow peers.

The first type of indicia, used to initially determine that a peer is potentially a slow peer, may be a measure of the latency of one or more update messages for the peer associated with an update group, for example, timestamps associated with update messages in the update message cache 238 corresponding to the update group. Such timestamps associated with update messages (e.g., the timestamp associated with an oldest update message in the update message cache 238) may be compared to the current time, to determine if a timestamp associated with an update message for the peer lags more than a configured slow peer time threshold behind the current time, similar to as described above.

The one or more second types of indicia may include a measure of resource utilization at the exterior router 200 that may identify circumstances known to promote false-identification of slow peers. For example, the measure of resource utilization may be a measure of processor usage of the processor(s) 220 of the router 200. If the usage of the processor(s) 220 is extremely high (e.g., approaching 100%), it is possible that software processes responsible for removing update messages from the one or more update message caches 238 may lag, due to insufficient processor cycles. In such a case, the time-stamp associated with an update message may be caused to lag behind the current time by more than a configured slow peer time threshold, for a reason unrelated to the responsiveness of the peer associated with that update message. By verifying resource utilization (e.g., processor usage) on the router 200 is below a predetermined threshold (e.g., below 90% utilization), and permitting peers to be classified as slow peers only if this is the case, false-identification of slow peers may be minimized.

The one or more second types of indicia may also include measures or indications of network congestion and/or insufficient processing rate at the peer, that are obtained from the reliable transport protocol (e.g., TCP). For example, the measure of network congestion may be the length of time spent in the retransmit state define by the retransmission timer 242 corresponding to the connection with the peer used by TCP. Further, the measure of insufficient processing rate at the peer may be the length of the retransmit state defined by the retransmission timer 244 corresponding to the connection with the peer used by TCP. If the network has truly become congested, the length of the retransmission timer 242 will increase in length with the increasing congestion. By verifying that the length of the retransmit state defined by the retransmission timer 242 has in-creased by at least a predetermined amount (e.g., by at least 20%) over a predetermined period of time (e.g., 30 seconds), a "sanity" check may be performed. Similarly, if the processing rate at the peer has truly become insufficient, the length of the persist state defined by the persist timer 244 should increase in length with the peer becoming over-burdened. By verifying that the length of persist state defined by the persist timer 244 has increased by at least a predetermined amount (e.g., by at least 20%) over a predetermined period of time (e.g., 30 seconds), a further "sanity" check may be performed. By permitting peers to be classified as slow peers only if either the length of the retransmit state defined by the retransmission timer 242, or the length of the persist state defined persist timer 244, has increased by at least a predetermined amount over a predetermined period of time, false-identification of slow peers may be further minimized.

Figure 4:
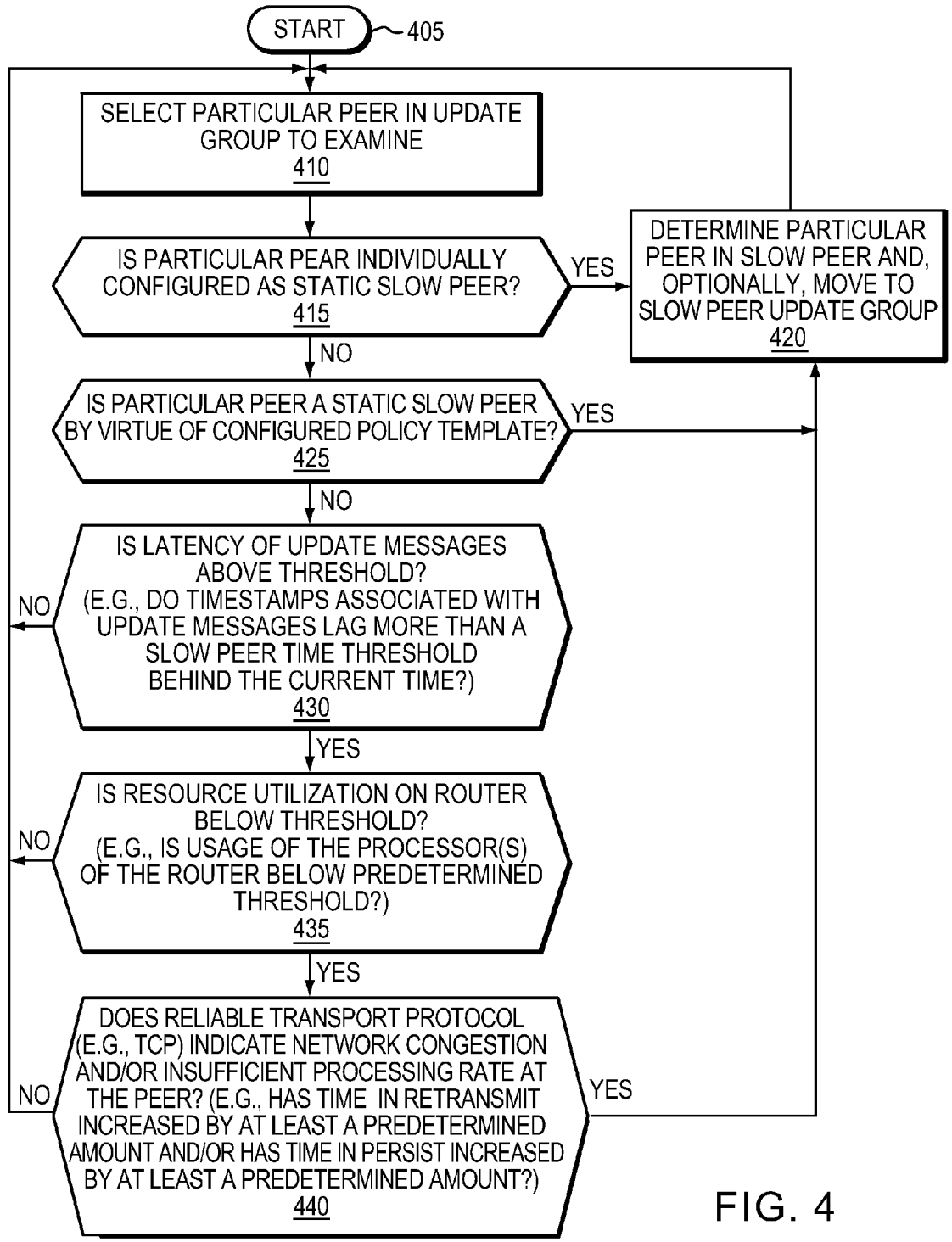
FIG. 4 is a flow diagram of an example sequence of steps for improved slow peer detection that employs one or more second types of indicia to verify/confirm that a peer, indicated by a first type of indicia to be a potential slow peer, is actually a slow peer.

FIG. 4 is a flow diagram of an example sequence of steps for improved slow peer detection that employs one or more second types of indicia to verify/confirm that a peer, indicated by a first type of indicia to be a potential slow peer, is actually a slow peer. The sequence begin at step 405, and proceeds to step 410 where the router operating system 232 working in conjunction with, for example, the BGP process 234 and other processes on an exterior router 200, selects a particular peer in an update group (e.g., a first peer) to examine. At step 415, it is determined whether the particular peer is individually configured as a static slow peer, for example, by a network administrator or other user via a command line interface (CLI) of the router operating system 232. If so, execution proceeds to step 420, where the particular peer is determined to be a slow peer and, optionally, moved from the original update group to the slow peer update group. If not, execution proceeds to step 425, where the router operating system 232 determines whether the particular peer should be considered a static slow peer by virtue of a configured policy template. If so, execution proceeds to step 420, where the particular peer is determined to be a slow peer and, optionally, moved from the original update group to the slow peer update group. If not, execution proceeds to step 430.

At step 430 the router operating system 232, working in conjunction with, for example, the BGP process 234 and other processes, examines a first type of indicia to determine if the particular peer is potentially a slow peer. For example, a measure of the latency of one or more update messages associated with an update group may compared to a threshold. More specifically, timestamps associated with update messages in the update message cache 238 corresponding to the original update group (e.g., the timestamp associated with an oldest update message in the update message cache 238) may be compared with a current time to determine if the timestamps lag more than a configured slow peer time threshold behind the current time. If so (e.g., the timestamps lag more than a configured slow peer time threshold behind the current time), the particular peer is considered a potential slow peer, and execution proceeds to step 435. If not, execution loops back to step 410, where another particular peer in the update group (e.g., a next peer) is selected to examine.

At step 435, the router operating system 232, working in conjunction with, for example, the BGP process 234 and other processes, examines a second type of indicia to confirm/verify that the potential slow peer is actually a slow peer. For example, a measure of resource utilization on the exterior router 200 may be compared to a threshold. More specifically, usage of the processor(s) 220 of the router may be compared to a pre-determined threshold (e.g., 90% utilization), to verify that the usage is below a point where software processes responsible for removing update messages from the one or more update message caches 238 become starved of processor cycles. If so (e.g., usage is below the predetermined threshold), the potential slow peer may be considered a probable slow peer, and execution proceeds to step 440. If not, execution loops back to step 410, where another particular peer in the update group (e.g., a next peer) is selected to be examined.

At step 440, the router operating system 232, working in conjunction with, for example, the BGP process 234 and other processes, examines additional second types of indicia to confirm/verify that the potential slow peer is actually a slow peer. For example, indications of network congestion and/or insufficient processing rate at the peer obtained from the reliable transport protocol (e.g., TCP) used with the update messages may be examined, to see if they have increased by at least a predetermined amount over a pre-determined period of time. More specifically, a current length of the retransmission timer 242 corresponding to the TCP connection with the peer is compared with a past length of the retransmission timer 242 (e.g., 30 seconds ago) to determined if the retransmit state has increased by at least a predetermined amount (e.g., by at least 20%), to verify that the network has truly become congested, and/or a current length of the persist timer 242 corresponding to the TCP connection with the peer is compared with a past length of the persist timer 244 (e.g., 30 seconds ago) to determined if the persist state has increased by at least a predetermined amount (e.g., by at least 20%), to verify that the peer has truly become overburdened. If so (e.g., either the retransmit state defined by the retransmission timer 242 or the persist state defined by the persist timer 244 has increased in length by at least a predetermined amount), execution proceed to step 420, where the particular peer is finally determined to be a slow peer and, optionally, moved from the original update group to the slow peer update group. If not, execution loops back to step 410, where another particular peer in the update group (e.g., a next peer) is selected to examine.

The sequence of steps may continue though each peer in the update group, and periodically re-determine if a peer has become a slow peer. The sequence may be terminated (not shown) should a network administrator or other user choose to disable dynamic determination of slow peers, or based on other factors.

The above described embodiments examine one or more second types of indicia to verify/confirm a peer that has been indicated by examination of first type of indicia to be a potential slow peer, is actually a slow peer. As discussed above, by examining one or more second types of indicia, various circumstances that are known to promote false-identification may be checked for, and criteria consistent with the existence of a slow peer may be verified, thereby reducing false-identifications of slow peers.

It should be understood that various adaptations and modifications may be made within the spirit and scope of the embodiments herein. For example, while the embodiments described above may be implemented in a router, such as exterior router 200, it should be understood that a variety of alternative network nodes/devices may perform the functions discussed above.

Further, it should be understood that at least some of the above-described embodiments may be implemented in software, in hardware, or a combination thereof. A software implementation may include computer-executable instructions stored in a non-transitory computer-readable medium, such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example. It is the object of the appended claims to cover all such variations and modifications as come within the true spirit and scope of the embodiments herein.

What is claimed is:

1. A method, comprising:
   selecting, by a router, a particular peer of the router from an original update group used by an Exterior Gateway Protocol (EGP), the original update group including a plurality of peers of the router that share a same outbound policy and that receive common update messages, from the router, of routing table information;
   determining that the particular peer is a potential slow peer based on a first type of indicia, wherein a slow peer is a peer that cannot keep up with a rate at which the router generates update messages over a prolonged period of time; and
   determining that the potential slow peer is a slow peer based on one or more second types of indicia, wherein the second type of indicia and the first type of indicia are different.

2. The method of claim 1, further comprising:
   in response to determining that the particular peer is a slow peer, moving the slow peer from the original update group to a separate slow peer update group reserved for peers that are slow in consuming update messages.

3. The method of claim 1, wherein the first type of indicia includes a measure of latency of one or more update messages associated with the original update group.

4. The method of claim 1, wherein the first type of indicia includes one or more time-stamps associated with update messages and the determining that the particular peer is a potential slow further comprises:
   comparing the one or more timestamps associated with update messages to a current time and determining that the particular peer is a potential slow peer if a timestamp associated with an update message for the particular peer lags more than a configured slow peer time threshold behind the current time.

5. The method of claim 1, wherein the second types of indicia include a measure of resource utilization at the router.

6. The method of claim 1, wherein the second types of indicia include processor usage of one or more processors of the router, and the determining that the potential slow peer is a slow peer further comprises:
   comparing the processor usage to a predetermined threshold and confirming that the processor usage is below the predetermined threshold.

7. The method of claim 1, wherein the second types of indicia include an indication of network congestion obtained from a reliable transport protocol used with the update messages.

8. The method of claim 1, wherein the second types of indicia include a length of a retransmit state defined by a retransmission timer corresponding to a connection of a relic able transport protocol used with the update messages, and the determining that the potential slow peer is a slow peer further comprises:
verifying the length of the retransmit state defined the retransmission timer has increased by at least a predetermined amount over a predetermined period of time.

9. The method of claim 1, wherein the second types of indicia include an indication of insufficient processing rate at the peer obtained from a reliable transport protocol used with the update messages.

10. The method of claim 1, wherein the second types of indicia include a length of a persist state defined by a persist timer corresponding to a connection of a reliable transport protocol used with the update messages, and the determining that the potential slow peer is a slow peer further comprises:
verifying the length of the persist state defined by the persist timer has increased by at least a predetermined amount over a predetermined period of time.

11. The method of claim 1, wherein the second types of indicia include a measure of resource utilization at the router, an indication of network congestion obtained from a relic able transport protocol used with the update messages and an indication of insufficient processing rate at the peer obtained from the reliable transport protocol used with the update messages.

12. The method of claim 1, wherein the EGP is Border Gateway Protocol (BGP).

13. An apparatus, comprising:
a network interface configured to couple the apparatus to peers;
a processor coupled to the network interface and configured to execute one or more processes; and
a memory configured to store the one or more processes executable by the processor, the processes when executed operable to
select a particular peer from an original update group used by an Exterior Gateway Protocol (EGP), the original update group including a plurality of peers that share a same outbound policy and that receive common update messages,
determine that the particular peer is a potential slow peer based on a first type of indicia, wherein a slow peer is a peer that cannot keep up with a rate at which the apparatus generates update messages over a prolonged period of time, and
determine that the potential slow peer is a slow peer, based on one or more second types of indicia, wherein the second type of indicia and the first type of indicia are different.

14. The apparatus of claim 13, wherein the processes, when executed, are further operable to:
move the slow peer from the original update group to a separate slow peer update group reserved for peers that are slow in consuming update messages, based on determination that the particular peer is a slow peer.

15. The apparatus of claim 13, wherein the first type of indicia includes a measure of latency of one or more update messages associated with the original update group.

16. The apparatus of claim 13, wherein the second types of indicia include a measure of resource utilization at the apparatus.

17. The apparatus of claim 13, wherein the second types of indicia include an indication of network congestion obtained from a reliable transport protocol used with the update messages.

18. The apparatus of claim 13, wherein the second types of indicia include an indication of insufficient processing rate at the peer obtained from a reliable transport protocol used with the update messages.

19. The apparatus of claim 13, wherein the EGP is Border Gateway Protocol (BGP).

20. An apparatus comprising:
means selecting a particular peer of the apparatus from an original update group used by an Exterior Gateway Protocol (EGP), the original update group including a plurality of peers of the apparatus that share a same outbound policy and that receive common update messages, from the apparatus, of routing table information;
means for determining that the particular peer is a potential slow peer based on a first type of indicia, wherein a slow peer is a peer that cannot keep up with a rate at which the apparatus generates update messages over a prolonged period of time; and
means for determining that the potential slow peer is a slow peer, based on one or more second types of indicia, wherein the second type of indicia and the first type of indicia are different.

* * * * *